(12) United States Patent
Torita et al.

(10) Patent No.: US 10,964,952 B2
(45) Date of Patent: Mar. 30, 2021

(54) POSITIVE ELECTRODE AND NON-AQUEOUS ELECTROLYTE SECONDARY BATTERY INCLUDING THE SAME

(71) Applicant: TOYOTA JIDOSHA KABUSHIKI KAISHA, Toyota (JP)

(72) Inventors: Koji Torita, Nagoya (JP); Shuji Tsutsumi, Ikoma (JP); Yusuke Fukumoto, Toyonaka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 16/139,129

(22) Filed: Sep. 24, 2018

(65) Prior Publication Data

US 2019/0123357 A1     Apr. 25, 2019

(30) Foreign Application Priority Data

Oct. 25, 2017   (JP) .............................. JP2017-206208

(51) Int. Cl.
| | |
|---|---|
| *H01M 4/00* | (2006.01) |
| *H01M 4/62* | (2006.01) |
| *H01M 10/0525* | (2010.01) |
| *H01M 4/36* | (2006.01) |
| *H01M 4/02* | (2006.01) |

(52) U.S. Cl.
CPC .......... *H01M 4/628* (2013.01); *H01M 4/366* (2013.01); *H01M 4/624* (2013.01); *H01M 10/0525* (2013.01); *H01M 2004/028* (2013.01)

(58) Field of Classification Search
CPC .................................................... H01M 4/628
See application file for complete search history.

(56) References Cited

U.S. PATENT DOCUMENTS

2007/0048615 A1\*   3/2007   Nagayama .............. H01M 2/16
                                                               429/246
2016/0190566 A1    6/2016   Shiozaki et al.

FOREIGN PATENT DOCUMENTS

| JP | 2006-324118 A | 11/2006 |
|---|---|---|
| JP | 2016-127000 A | 7/2016 |

\* cited by examiner

*Primary Examiner* — Milton I Cano
*Assistant Examiner* — Jenna Shulman
(74) *Attorney, Agent, or Firm* — Sughrue Mion, PLLC (57) ABSTRACT

A positive electrode for a non-aqueous electrolyte secondary battery includes a positive electrode current collector, a protective layer provided on a surface of the positive electrode current collector, and a positive electrode composite material layer containing a positive electrode active material provided on a surface of the protective layer. The protective layer includes an insulating filler, a binder, and a conductive material. The protective layer is composed of a central portion and an end portion in a plan view as seen from the stacking direction. The ratio of the conductive material in the end portion of the protective layer is smaller than the ratio of the conductive material in the central portion of the protective layer. The ratio Sc/S of the area Sc of the end portion of the protective layer to the total area S of the protective layer in plan view is 0.12 or more.

5 Claims, 3 Drawing Sheets

POSITIVE ELECTRODE AND NON-AQUEOUS ELECTROLYTE SECONDARY BATTERY INCLUDING THE SAME

This non-provisional application is based on Japanese Patent Application No. 2017-206208 filed on Oct. 25, 2017 with the Japan Patent Office, the entire contents of which are hereby incorporated by reference.

BACKGROUND

Field

The present disclosure relates to a positive electrode and a non-aqueous electrolyte secondary battery including the same.

Description of the Background Art

Japanese Patent Laying-Open No. 2016-127000 discloses a positive electrode including a positive electrode current collector, a positive electrode composite material layer, and a protective layer provided therebetween. Japanese Patent Laying-Open No. 2016-127000 describes that this positive electrode is capable of maintaining favorable current collecting performance, and owing to the protection layer, capable of preventing an oxidation-reduction reaction from occurring between the positive electrode active material and the positive electrode current collector (aluminum) when an internal short circuit or the like causes a temperature rise, and thereby suppressing further heat generation.

SUMMARY

When a nail penetration occurs, it is required to suppress the heat generation of the battery. The term of "nail penetration" refers to an abnormal mode in which a conductive foreign object having a sharp tip penetrates the battery. In a nail penetration, the positive electrode and the negative electrode are short-circuited by the conductive foreign object. As a result. Joule heat is generated, and thereby the temperature of the battery rises. Furthermore, due to the impact imparted when the conductive foreign substance penetrates the positive electrode, the positive electrode composite material layer may be peeled off from the positive electrode current collector so as to expose the positive electrode current collector. When the exposed positive electrode current collector and the negative electrode are short-circuited, a large current flows, and thereby more heat will be generated.

As described in Japanese Patent Laying-Open No. 2016-127000, by providing a protective layer between the positive electrode current collector and the positive electrode composite material layer, it is possible to prevent the positive electrode current collector from being exposed in a nail penetration, which makes it possible to suppress the heat generation.

However, the inventors of the present disclosure have found that by providing a protective layer as described in Japanese Patent Laying-Open No. 2016-127000, it is possible to suppress the temperature rise when a short circuit due to a nail penetration or the like occurs at a center portion of the positive electrode (positive electrode composite material layer), but when a short circuit due to a nail penetration or the like occurs at an end portion of the positive electrode, the temperature rise can not be suppressed sufficiently.

Accordingly, an object of the present disclosure is to provide a positive electrode capable of suppressing a temperature rise sufficiently even when a short circuit due to a nail penetration or the like occurs at an end portion of the positive electrode, and a non-aqueous electrolyte secondary battery including the positive electrode.

[1] A positive electrode for a non-aqueous electrolyte secondary battery of the present disclosure includes a positive electrode current collector, a protective layer provided on a surface of the positive electrode current collector, and a positive electrode composite material layer containing a positive electrode active material provided on a surface of the protective layer. The protective layer includes an insulating filler, a binder and a conductive material. The protective layer is composed of a central portion and an end portion in a plan view as viewed from the stacking direction of the positive electrode current collector, the protective layer and the positive electrode composite material layer. The ratio of the conductive material in the end portion of the protective layer is smaller than the ratio of the conductive material in the central portion of the protective layer. The ratio Sc/S of the area Sc of the end portion of the protective layer to the total area S of the protective layer in the plan view is 0.12 or more.

According to the present disclosure, in the protective layer interposed between the positive electrode current collector and the positive electrode composite material layer (positive electrode active material), by decreasing the ratio of the conductive material in the end portion lower than the ratio of the conductive material in the center portion, even when a short circuit due to a nail penetration or the like occurs at the end portion of the positive electrode, it is possible for the positive electrode and the non-aqueous electrolyte secondary battery including the positive electrode to sufficiently suppress the temperature rise. The reason therefor will be described hereinafter.

When heat is generated by an internal short circuit due to a nail penetration or the like at the end portion of the positive electrode (positive electrode composite material layer), since the heat dissipation area of the positive electrode current collector around the position of the short circuit is relatively small, the heat dissipation efficiency is low, which makes it easy for the temperature to become high. However, in the present disclosure, since the resistance of the end portion of the positive electrode is increased by reducing the ratio of the conductive material in the end portion of the protective layer smaller than that in the central portion, even when a short circuit occurs near the end portion of the positive electrode, the amount of short circuit current at the end is reduced. Therefore, it is possible to suppress the temperature rise at the end portion of the positive electrode due to the reason that the heat dissipation area of the positive electrode current collector around the position of the short circuit is relatively small, which makes it possible to prevent the temperature of the end portion of the positive electrode from going high. Since the resistance is increased only at the end of the positive electrode and the conductivity of the central portion is maintained, the conductivity of the entire positive electrode is maintained substantially, which makes it possible to guarantee the discharging ability of the battery.

Furthermore, after various investigations, the inventors of the present disclosure have found that by controlling the ratio Sc/S of the area Sc of the end portion of the protective layer to the total area S of the protective layer in plan view at 0.12 or more, it is possible to suppress the temperature rise when a short circuit due to a nail penetration or the like occurs at the end portion of the positive electrode.

[2] The ratio Sc/S is preferably 0.45 or less, which makes it possible to suppress an increase in battery resistance.

[3] The present disclosure also provides a non-aqueous electrolyte secondary battery including the positive electrode according to the above [1] or [2]. Since the non-aqueous electrolyte secondary battery of present disclosure includes the positive electrode, it is possible for it to sufficiently suppress the temperature rise even when a short circuit due to a nail penetration or the like occurs at the end portion of the positive electrode.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment of the present disclosure (hereinafter referred to as "the present embodiment") will be described. It should be noted that the following description is not intended to limit the scope of the present disclosure.

<Non-Aqueous Electrolyte Secondary Battery>

The term of "non-aqueous electrolyte secondary battery" in the present specification refers to such a battery that does not contain water in the electrolyte. Hereinafter, the non-aqueous electrolyte secondary battery may be abbreviated as "battery" where necessary.

Figure 1:
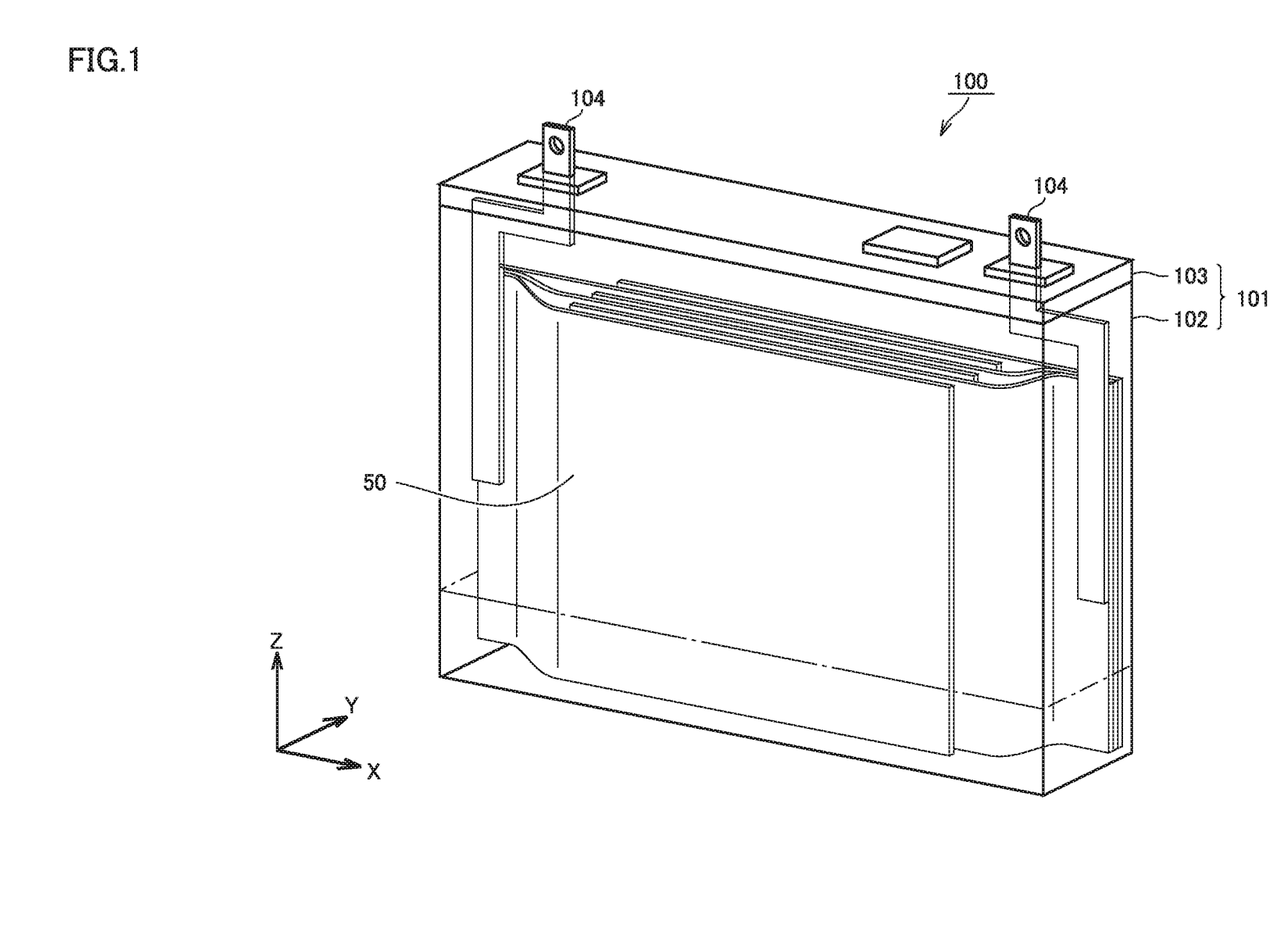
FIG. 1 is a schematic diagram illustrating an example configuration of a non-aqueous electrolyte secondary battery according to an embodiment of the present disclosure.

FIG. 1 is a schematic view illustrating an example configuration of a non-aqueous electrolyte secondary battery according to the present embodiment. The battery 100 has a square shape. However, the battery of the present embodiment should not be limited to the square shape. The battery of the present embodiment may be cylindrical.

The battery 100 includes a case 101. The case 101 is hermetically sealed. The case 101 may be made of metal, for example. The case 101 may be made of, for example, an aluminum (Al) alloy or the like. However, as long as the case can be hermetically sealed, the case may be in the form of a pouch made of, for example, an aluminum laminated film or the like. In other words, the battery of the present embodiment may be a laminate-type battery.

The case 101 includes a container 102 and a lid 103. The lid 103 is joined to the container 102 by laser welding, for example. The lid 103 is provided with a pair of external terminals 104. The lid 103 may be provided with an injection port, a gas discharge valve, a current interruption mechanism (CID) and the like.

Figure 2:
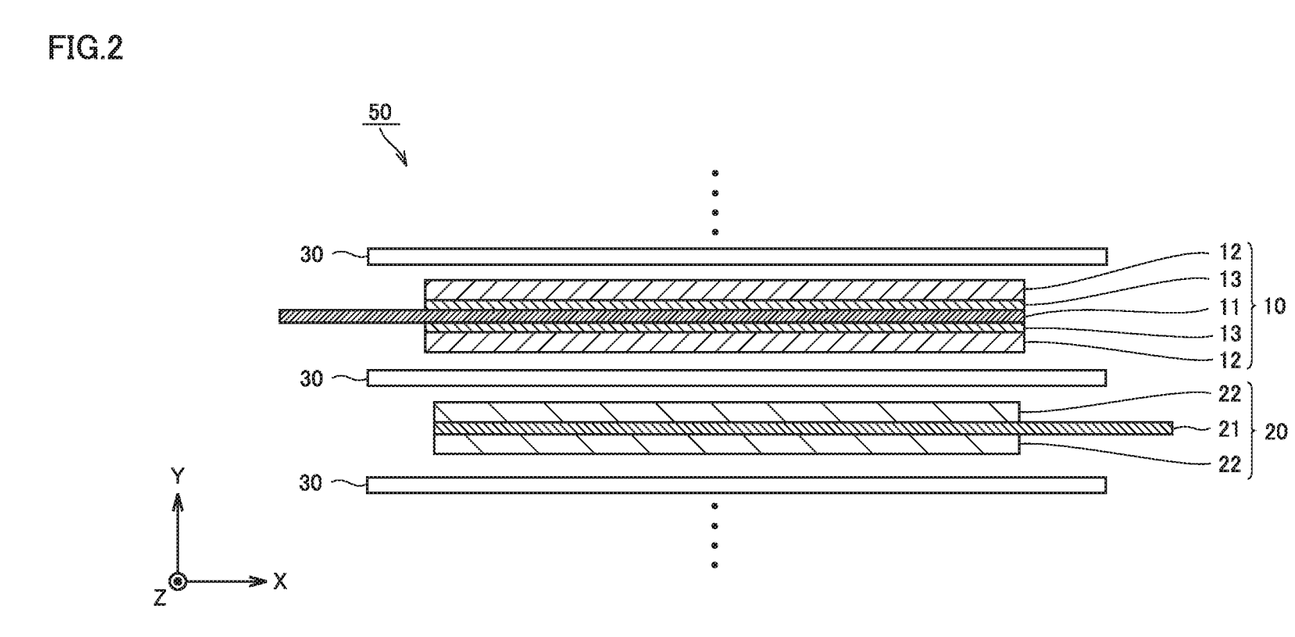
FIG. 2 is a conceptual cross-sectional view illustrating an example configuration of an electrode group according to an embodiment of the present disclosure.

The case 101 houses an electrode group 50 and an electrolyte solution (the dot-chain line in FIG. 2 indicates the liquid surface of the electrolyte solution). The electrode group 50 is electrically connected to the pair of external terminals 104. The electrolyte solution is also present inside the electrode group 50.

FIG. 2 is a conceptual cross-sectional view illustrating an example configuration of the electrode group according to the present embodiment. The electrode group 50 is a stack type. Specifically, the electrode group 50 is formed by alternately stacking the positive electrode 10 and the negative electrode 20 with the separator 30 sandwiched between the positive electrode 10 and the negative electrode 20. In particular, when a stacked electrode group is used in a non-aqueous electrolyte secondary battery, generally it is difficult to sufficiently suppress a temperature rise due to a short circuit caused by a nail penetration or the like at the end of the positive electrode. Therefore, the present disclosure is particularly useful when a stacked electrode group is used.

It should be noted that the electrode group of the present embodiment is not limited to a stack type, it may be a winding type. The winding-type electrode group may be formed, for example, by stacking a positive electrode, a separator and a negative electrode in order and winding the same spirally.

"Positive Electrode"

Figure 3:
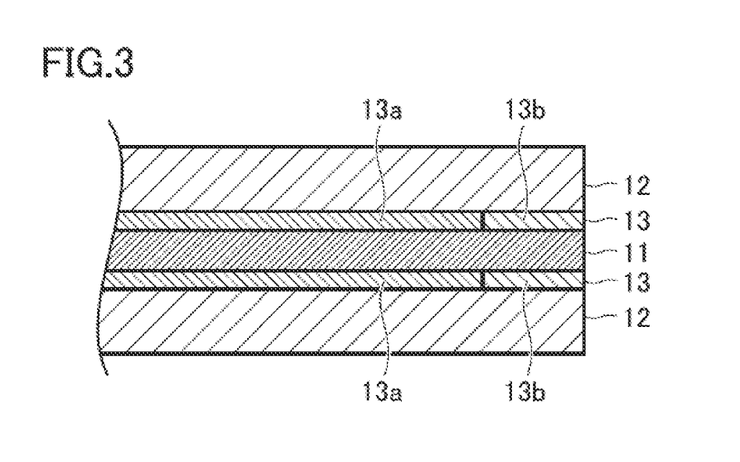
FIG. 3 is a schematic cross-sectional view (taken along the line Y-Y' in FIG. 4) illustrating an example configuration of a positive electrode according to an embodiment of the present disclosure.

With reference to FIG. 3, the positive electrode 10 includes a positive electrode current collector 11, a protective layer 13, and a positive electrode composite material layer 12. The protective layer 13 is provided on a surface (both of the front surface and the rear surface or only one surface) of the positive electrode current collector 11. The positive electrode composite material layer 12 is provided on a surface of the protective layer 13 (the surface opposite to the positive electrode current collector 11). The positive electrode 10 may have a portion (exposed portion 11a) where the positive electrode current collector 11 is exposed from the positive electrode composite material layer 12 so as to provide a connection to the external terminal 104.

(Positive Electrode Current Collector)

The positive electrode current collector 11 is an electrode substrate having conductivity. The positive electrode current collector 11 may be an aluminum foil such as a pure Al foil or an Al alloy foil. The positive electrode current collector 11 may have a thickness of, for example, 5 μm or more and 50 μm or less.

(Positive Electrode Composite Material Layer)

The positive electrode composite material layer 12 may have a thickness of 10 to 200 μm or a thickness of 100 to 200 μm, for example. The positive electrode composite material layer 12 contains a positive electrode active material.

As examples of the positive electrode active material, a lithium-containing metal oxide, a lithium-containing phosphate and the like may be given. As examples of the lithium-containing metal oxide, for example, $LiCoO_2$, $LiNiO_2$, a compound represented by the general formula $LiNi_aCo_bO_2$ (wherein a+b=1, 0<a<1, 0<b<1), $LiMnO_2$, $LiMn_2O_4$, a compound represented by the general formula $LiNi_aCo_bMn_cO_2$ (wherein a+b+c=1, 0<a<1, 0<b<1, 0<c<1), and the like may be given. As examples of a compound represented by the general formula $LiNi_aCo_bMn_cO_2$. $LiNi_{1/3}Co_{1/3}Mn_{1/3}O_2$ and the like may be given. As examples of the lithium-containing phosphate, $LiFePO_4$ and the like may be given. It should be noted that the positive electrode active material may be used alone in one kind or may be used in combination of two or more kinds. The average particle size of the positive electrode active material may be, for example, about 1 to 25 μm. The average particle size in the present specification represents the particle size of 50% accumulation from the finest particle in the volume-based particle size distribution measured by a laser diffraction scattering method.

In addition to the ingredients such as the positive electrode active material, the positive electrode composite material layer may contain a binder, a thickener, a conductive material and the like.

As examples of the binder, styrene butadiene rubber (SBR), acrylonitrile butadiene rubber (NBR), polytetrafluoroethylene (PTFE) and the like may be given.

As examples of the thickener, carboxymethyl cellulose (CMC), alginic acid, hydroxypropylmethyl cellulose (HPMC), polyethylene oxide (PEO), polyacrylic acid (PAA), polysaccharide thickener and the like may be given.

As examples of the conductive material, carbon blacks such as acetylene black (AB), thermal black, furnace black and the like may be given. It is expected that the conductive material would improve the electron conductivity.

(Protective Layer)

The protective layer 13 includes an insulating filler, a binder, and a conductive material. Using the protective layer 13 containing the insulating filler to protect the positive electrode current collector 11, it is possible to prevent the positive electrode current collector 11 from being exposed in a nail penetration, which makes it possible to prevent a low-resistance short circuit from occurring between the positive electrode current collector 11 and the negative electrode 20 (negative electrode composite material layer 22). As a result, the temperature rise of the battery in a nail penetration can be suppressed.

The insulating (electrically insulating) filler is not particularly limited. As examples of the insulating filler, inorganic oxides such as alumina (aluminum oxide: $Al_2O_3$), manganese oxide, silicon dioxide and titanium dioxide, boehmite (AlOOH), and the like may be given. Preferably, the insulating filler is alumina.

The shape of the insulating filler is not particularly limited. The electrically insulating filler may be, for example, spherical, massive, tabular, acicular and the like. The electrically insulating filler may have an average particle size of, for example, 0.1 to 5 μm.

It should be noted that the binder and the conductive material may use the same material as those contained in the positive electrode composite material layer.

Figure 4:
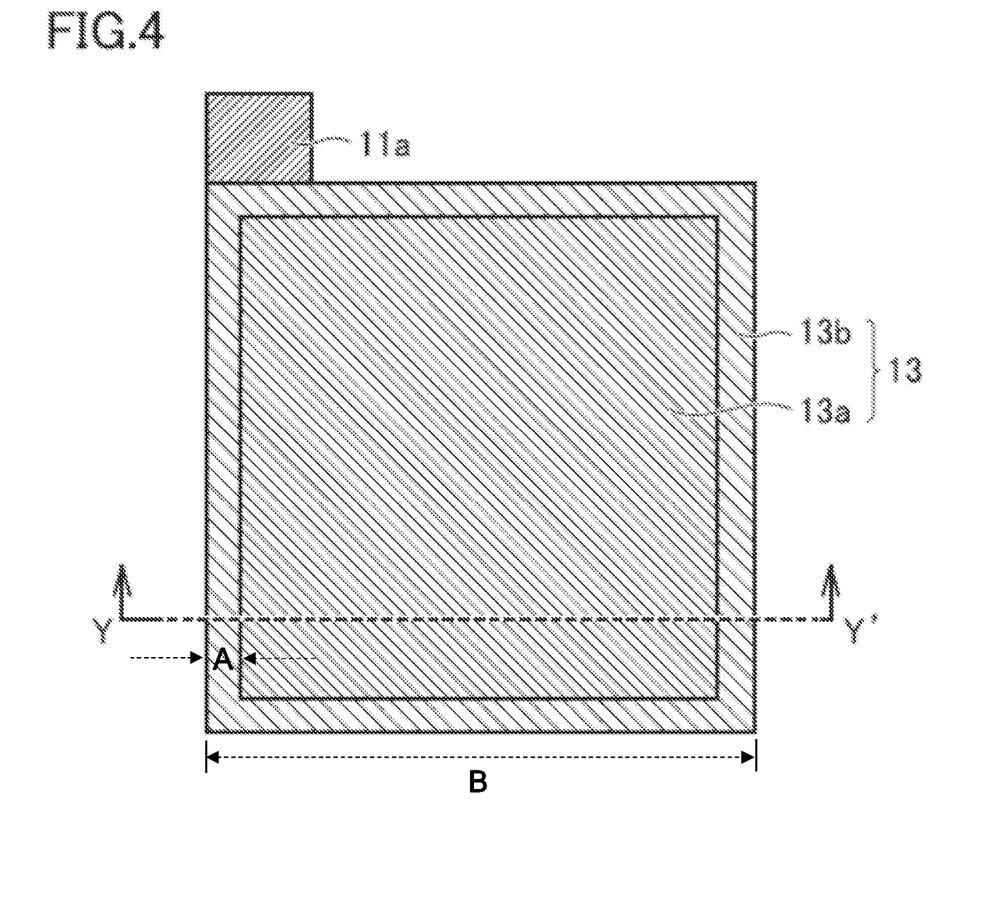
FIG. 4 is a schematic plan view illustrating an example configuration of the positive electrode according to an embodiment of the present disclosure.

With reference to FIGS. 3 and 4, the protective layer 13 is composed of a central portion 13a and an end portion 13b in plan view (FIG. 4) as seen from the stacking direction of the positive electrode current collector 11, the protective layer 13 and the positive electrode composite material layer 12, and the ratio of the conductive material in the end portion 13b of the protective layer 13 is smaller than the ratio of the conductive material in the central portion 13a of the protective layer 13. Thus, the resistance of the end portion of the positive electrode 10 is increased, and thereby, even when a short circuit occurs near the end portion of the positive electrode 10, the amount of short circuit current at the end portion is reduced. Therefore, the temperature rise at the end portion of the positive electrode 10 is suppressed, which makes it possible to prevent the temperature of the end portion of the positive electrode 10 from going high. Since the resistance is increased only at the end portion of the positive electrode 10 and the conductivity is maintained at the central portion, the conductivity of the entire positive electrode 10 is maintained, which makes it possible to guarantee the discharging ability of the battery.

Furthermore, in the plan view (FIG. 4) mentioned above, the ratio Sc/S of the area Sc of the end portion 13b of the protective layer 13 to the total area S of the protective layer 13 (that is, the sum of the area of the central portion 13a and the area of the end portion 13b) is 0.12 or more, which makes it possible to suppress the temperature rise when a short circuit due to a nail penetration or the like occurs at the end portion of the positive electrode 10. From the viewpoint of suppressing an increase in battery resistance, the ratio Sc/S is preferably 0.45 or less, and more preferably 0.31 or less.

For example, when the protective layer (positive electrode composite material layer) has a square shape as illustrated in the plan view of FIG. 4, the width of the entire protective layer 13 (the distance between one side (one end surface) of the protective layer 13 and the other side (the other end surface) facing the one side) is represented by B, and the width of the end portion 13b (one end portion) of the protective layer 13 (the distance between one side of the protective layer 13 and the boundary line of the end portion 13b and the central portion 13a) is represented by A. In this case, the ratio A/B of the width A of the end portion 13b of the protective layer 13 to the width B of the protective layer 13 (positive electrode composite material layer 12) is preferably 0.03 or more. Thereby, it is possible to suppress the temperature rise more reliably when a short circuit due to a nail penetration or the like occurs at the end portion of the positive electrode 10. From the viewpoint of suppressing an increase in battery resistance, the ratio A/B is preferably 0.13 or less.

The thickness of the protective layer 13 is preferably 0.5 μm or more and 5 μm or less. If the thickness of the protective layer 13 is too thin, it is difficult to prevent a low-resistance short circuit from occurring between the positive electrode current collector 11 and the negative electrode 20 (negative electrode composite material layer 22) in a nail penetration, and if the protective layer 13 is too thick, it is difficult to increase the energy density of the battery.

Note that in the present specification the area of each member may be calculated from the measured values of dimensions of each member, or may be obtained by image processing of a photograph (image) taken from each member.

The thickness of the end portion 13b of the protective layer 13 may be the same as or may be different from the thickness of the central portion 13a of the protective layer 13. For example, a positive electrode may be obtained in such a manner that a material for forming the end portion of the protective layer is coated and dried, and thereafter a material for forming the central portion of the protective layer is applied to the entire surface of the protective layer including the end portion and then dried, and such positive electrode may still attain the effects of the present disclosure. In this case, the thickness of the end portion 13b of the protective layer 13 may be greater than the thickness of the central portion 13a of the protective layer 13.

The ratio of the conductive material in the end portion 13b of the protective layer 13 is preferably 3 mass % or less, which makes it possible to suppress the temperature rise more reliably when a short circuit due to a nail penetration or the like occurs at the end portion of the positive electrode 10 (the positive electrode composite material layer 12). From the viewpoint of maintaining the desired discharging ability of the battery, the ratio of the conductive material in the end portion 13b of the protective layer 13 is preferably 0.5 mass % or more.

In order to prevent a low-resistance short circuit from occurring between the positive electrode current collector 11 and the negative electrode 20 (the negative electrode composite material layer 22), the ratio of the conductive material in the central portion 13a of the protective layer 13 is preferably 8 mass % or less, and from the viewpoint of maintaining the desired discharging ability of the battery, the ratio is preferably 1 mass % or more, and more preferably 1 mass % or more and 5 mass % or less.

"Negative Electrode"

The negative electrode 20 includes a negative electrode current collector 21 and a negative electrode composite material layer 22 formed on a surface of the negative electrode current collector 21. The negative electrode composite material layer 22 is supported on the surface of the negative electrode current collector 21, for example. The negative electrode 20 may have a portion where the negative electrode current collector 21 is exposed from the negative electrode composite material layer 22 so as to provide a connection to the external terminal 104.

[Negative Electrode Current Collector]

The negative electrode current collector 21 may be, for example, a Cu foil. The Cu foil may be a pure Cu foil or a Cu alloy foil. The negative electrode current collector 21 may have a thickness of, for example, 5 to 30 μm.

[Negative Electrode Composite Layer]

The negative electrode composite material layer 22 is formed on a surface (both of the front surface and the rear surface or only one surface) of the negative electrode current collector 21. The negative electrode composite material layer 22, for example, may have a thickness of 10 to 200 μm or a thickness of 50 to 150 μm.

The negative electrode composite material layer 22 contains a negative electrode active material. In addition, the negative electrode composite material layer 22 may further contain other additives (a binder, a thickener and the like).

(Negative Electrode Active Material)

As examples of the negative electrode active material, a carbon-based negative electrode active material such as graphite, soft carbon and hard carbon, and an alloy-based negative electrode active material containing silicon (Si), tin (Sn) and the like may be given. Note that the negative electrode active material may be used alone in one kind or in combination of two or more kinds. The average particle size of the negative electrode active material may be, for example, about 1 to 25 μm.

(Other Ingredients)

In addition to the negative electrode active material, the negative electrode composite material layer may contain other ingredients such as a binder, a thickener, a conductive material and the like similar to the positive electrode composite material layer.

"Separator"

The separator 30 is interposed between the positive electrode 10 and the negative electrode 20. The separator 30 is an electrically insulating porous film. The separator 30 may have a thickness of, for example, 10 to 50 μm. The separator 30 may be made of, for example, polyethylene (PE), polypropylene (PP) or the like. The separator 30 may have a multilayer structure. The separator 30 may be formed, for example, by laminating a porous PP film, a porous PE film, and a porous PP film in order.

"Electrolyte Solution (Non-Aqueous Electrolyte)"

The electrolyte solution contains at least a lithium (Li) salt and a solvent. The electrolyte solution may contain, for example, 0.5 mol/L or more and 2 mol/L or less of a Li salt. The Li salt is a supporting electrolyte. The Li salt is dissolved in the solvent. The Li salt may be, for example, $LiPF_6$, $LiBF_4$, $Li[N(FSO_2)_2]$, $Li[N(CF_3SO_2)_2]$ or the like. The Li salt may be used alone in one kind or in combination of two or more kinds.

The solvent is aprotic. In other words, the electrolyte solution of the present embodiment is non-aqueous. The solvent may be, for example, a mixture of cyclic carbonate and chain carbonate. The mixing ratio may be, for example, cyclic carbonate:chain carbonate=1:9 to 5:5 in volume ratio.

The cyclic carbonate may be, for example, ethylene carbonate (EC), propylene carbonate (PC), butylene carbonate (BC), fluoroethylene carbonate (FEC) or the like. The cyclic carbonate may be used alone in one kind or in combination of two or more kinds.

The chain carbonate may be, for example, dimethyl carbonate (DMC), ethyl methyl carbonate (EMC), diethyl carbonate (DEC) or the like. The chain carbonate may be used alone in one kind or in combination of two or more kinds.

The solvent may include, for example, lactone, cyclic ether, chain ether, and carboxylic ester or the like. The lactone may be, for example, γ-butyrolactone (GBL), δ-valerolactone or the like. The cyclic ether may be, for example, tetrahydrofuran (THF), 1,3-dioxolane, 1,4-dioxane or the like. The chain ether may be, for example, 1,2-dimethoxyethane (DME) or the like. The carboxylic ester may be, for example, methyl formate (MF), methyl acetate (MA), methyl propionate (MP) or the like.

<Usage>

The positive electrode of the present embodiment can be used as a positive electrode for a secondary battery such as a non-aqueous electrolyte secondary battery (lithium ion secondary battery), for example. The secondary battery may be used as a power source of, for example, a hybrid vehicle (HV), an electric vehicle (EV), a plug-in hybrid vehicle (PHV) or the like. However, the usage of the positive electrode manufactured by the manufacturing method of the present disclosure is not limited, it may be applied to any secondary battery.

EXAMPLES

Hereinafter, examples of the present disclosure will be described. It should be noted that the following examples are not intended to limit the scope of the present disclosure.

Example 1

"Manufacture of Positive Electrode"

The following materials were prepared.

(Positive Electrode Current Collector)

aluminum foil (thickness: 15 μm)

(Materials for Protective Layer)

insulating filler: alumina conductive material: acetylene black (AB)

binder: polyvinylidene fluoride (PVDF)

solvent: N-methyl-2-pyrrolidone (NMP)

(Materials for Positive Electrode Composite Material Layer)

positive electrode active material: $LiNi_{0.5}Co_{0.2}Mn_{0.3}O_2$ (NCM 523)

conductive material: AB binder: PVDF solvent: NMP 93 parts by mass of alumina, 5 parts by mass of the conductive material (AB) and 2 parts by mass of the binder (PVDF) were mixed in the solvent to prepare a protective layer (central portion) paste. 96 parts by mass of alumina, 2 parts by mass of the conductive material (AB) and 2 parts by mass of the binder (PVDF) were mixed in the solvent to prepare a protective layer (end portion) paste.

The protective layer (central portion) paste and the protective layer (end portion) paste were applied to the surface (both surfaces) of the positive electrode current collector according to the gravure coating method and dried to form the protective layer. In detail, firstly, the protective layer (end portion) paste was applied to the surface of the end portion of the positive electrode current collector in a frame shape and dried to form the end portion of the protective layer, and thereafter, the protective layer (central portion) paste was applied to the surface surrounded by the end portion (i.e., the uncoated surface of the positive electrode current collector) and dried to form the central portion of the protective layer.

96 parts by mass of the positive electrode active material, 2 parts by mass of the conductive material, and 2 parts by mass of the binder were mixed in the solvent to a positive electrode material paste. The positive electrode mixture paste was applied to the surface of the protective layer formed on both surfaces of the positive electrode current collector by using a die coater and dried to form the positive electrode composite material layer. Thereby, a positive electrode was manufactured in which the protective layer and the positive electrode composite material layer were stacked in order on each of both surfaces of the positive electrode current collector. The positive electrode was further compressed and punched into a predetermined shape.

Thus, the obtained positive electrode (including the positive electrode composite material layer and the protective layer) had a square shape with a side length of 66 mm, the thickness of the protective layer was 4 μm, and the width of the end portion (one end portion) of the protective layer was 3 mm.

Examples 2 to 5, Comparative Example 2

The positive electrodes of Examples 2 to 5 and Comparative example 2 were manufactured in the same manner as Example 1 except that the width A (A/B and Sc/S) of the end portion of the protective layer was modified as listed in Table 1.

Example 6

The positive electrode of Example 6 was manufactured in the same manner as Example 1 except that the ratio of the conductive material in the end portion of the protective layer was modified to 3 mass % (i.e., alumina:conductive material:binder 95:3:2 (mass %)).

Example 7

The positive electrode of Example 7 was manufactured in the same manner as Example 1 except that the ratio of the conductive material in the end portion of the protective layer was modified to 1 mass % (i.e., alumina:conductive material:binder=97:1:2 (mass %)).

Example 8

The positive electrode of Example 8 was manufactured in the same manner as Example 1 except that a material for forming an end portion of the protective layer is coated and dried, and thereafter a material for forming a central portion of the protective layer is applied to the entire surface of the protective layer including the end portion and then dried. In Example 8, the end portion of the protective layer is thicker than the central portion of the protective layer.

Comparative Example 1

The positive electrode of Comparative example 1 was manufactured in the same manner as Example 1 except that an end portion having a smaller ratio of the conductive material was not provided in the protective layer (the entire protective layer was formed at the same composition as the central portion).

<Manufacture of Secondary Battery>

A non-aqueous electrolyte secondary battery (lithium ion secondary battery) was manufactured by using the positive electrode of the above examples and comparative examples, respectively.

"Manufacture of Negative Electrode"

The following materials were prepared.

negative electrode active material: natural graphite (average particle size: 20 μm)

binder: SBR thickener: CMC solvent: water negative electrode current collector: copper foil (thickness: 10 μm)

99 parts by mass of the negative electrode active material, 0.5 parts by mass of the binder, and 0.5 parts by mass of the thickener were mixed, then the solvent was added to the mixture, and the mixture was kneaded to prepare a negative electrode composite material paste (slurry). The addition amount of the solvent was adjusted so that the nonvolatile fraction of the obtained negative electrode composite material paste was 54 mass %. The term of "nonvolatile fraction" refers to a mass ratio of the ingredient (nonvolatile ingredient) other than the solvent to the total mass of all of the raw materials including the solvent.

The prepared negative electrode composite material slurry was applied to the surface (front and back surfaces) of the negative electrode current collector by using a die coater and dried to form a negative electrode in which the negative electrode composite material layer was formed on both surfaces of the negative electrode current collector. The negative electrode has a thickness of 190 μm. The obtained negative electrode was cut into a square shape with a side length of 66 mm. In this way, the negative electrode was manufactured.

"Separator"

A belt-like separator (porous film) was prepared. The separator has a thickness of 25 μm. The separator has a three-layer structure. The three-layer structure is formed by laminating a polypropylene porous layer, a polyethylene porous layer and a polypropylene porous layer in order.

"Manufacture of Electrode Group"

A positive electrode (positive electrode with a separator) wrapped in a pouch shape with a separator was manufactured. With the negative electrode being arranged on the outside, the negative electrodes (3 pieces) and the positive electrodes (2 pieces) were alternately stacked, and then a terminal (lead) was welded to a collector tab of each electrode (end portion of the electrode current collector). Thereby, a stacked electrode group was manufactured. The stacked electrode group was housed in a laminate pouch (a pouch made of aluminum laminated film).

An electrolyte solvent was prepared by mixing ethylene carbonate (EC), dimethyl carbonate (DMC) and ethyl methyl carbonate (EMC). By dissolving $LiPF_6$ in the electrolyte solvent, an electrolyte solution having the following composition was prepared.

Electrolyte solvent: [EC:DMC:EMC=3:3.4 (volume ratio)]

LiPF$_6$: 1.0 mol/L

A predetermined amount of electrolyte solution was injected into the laminate pouch, and then the laminate pouch was sealed under reduced pressure. Thereby, a non-aqueous electrolyte secondary battery (cell stack) was manufactured. The theoretical capacity (design capacity) of the battery was 750 mAh.

<Evaluation of Battery Performance>

[Nail Penetration Test]

The nail penetration test was conducted at an environmental temperature of 50° C. Specifically, the battery was charged to 4.2 V at a current rate of 0.5C (0.05C cut). "C" is a unit of current rate. "1C" represents a current rate at which the state-of-charge (SOC) reaches from 0% to 100% in 1 hour's charging.

Thereafter, a nail having a diameter of 2.0 mm was pierced into the battery at a speed of 120 mm/sec to penetrate the battery. The penetration position of the nail was set to a position of 1.5 mm from the edge of the positive electrode (positive electrode composite material layer). After the nail penetrated the battery, the maximum temperature of the battery surface (battery temperature) was measured by using a thermocouple. The measurement results are listed in Table 1.

[Measurement of IV Resistance]

The battery of each of the above examples and comparative examples was charged until the SOC reached 50%, and then discharged at a current rate of 1C for 10 seconds at an environmental temperature of 25° C. so as to obtain the resistance (IV resistance) of the battery on the basis of the discharge pulses (the relation between voltage drop amount and current rate). The measurement results are listed in Table 1. Each IV resistance value listed in Table 1 is a relative value when the measured value of the IV resistance for the battery using the positive electrode of Comparative example 1 is set to 100.

Reference Example 1

As reference example 1, the nail penetration test was conducted on a battery manufactured by using the positive electrode of comparative example 1 in the same manner as described in the above except that the penetration position of the nail was modified to substantially the center of the positive electrode (positive electrode composite material layer) and the battery temperature was measured. The results are also listed in Table 1.

TABLE 1

| | Protective Layer (Width B: 66 min) | | | | | | |
|---|---|---|---|---|---|---|---|
| | Ratio of Conductive Material (mass %) | | Width A of End Portion (mm) | A/B | Sc/S | Battery Temperature (° C.) | IV Resistance (with respect to comparative example 1) |
| | Central Portion | End Portion | | | | | |
| Reference Example 1 | 5 | 5 | 0 | 0.00 | 0.00 | 88 | — |
| Comparative Example 1 | 5 | 5 | 0 | 0.00 | 0.00 | 113 | 100 |
| Comparative Example 2 | 5 | 2 | 1 | 0.015 | 0.06 | 105 | 101 |
| Example 1 | 5 | 2 | 3 | 0.05 | 0.17 | 95 | 104 |
| Example 2 | 5 | 2 | 2 | 0.03 | 0.12 | 98 | 102 |
| Example 3 | 5 | 2 | 5.5 | 0.08 | 0.31 | 93 | 108 |
| Example 4 | 5 | 2 | 8.5 | 0.13 | 0.45 | 93 | 111 |
| Example 5 | 5 | 2 | 10 | 0.15 | 0.51 | 92 | 122 |
| Example 6 | 5 | 3 | 3 | 0.05 | 0.17 | 97 | 103 |
| Example 7 | 5 | 1 | 3 | 0.05 | 0.17 | 90 | 106 |
| Example 8 | 5 | 2 | 3 | 0.05 | 0.17 | 94 | 104 |

<Results>

As listed in Table 1, in Reference example 1, when the battery including the positive electrode of Comparative example 1 was used in a nail penetration test where a nail penetrates the central portion of the positive electrode (positive electrode composite material layer) in plan view (as seen from the stacking direction of the positive electrode current collector, the protective layer and the positive electrode composite material layer), the battery temperature was suppressed to 88° C. due to the effect of the protective layer. On the other hand, in Comparative example 1, when the same battery was used in the nail penetration test where a nail penetrates the end portion (a position of 1.5 mm from the edge) of the positive electrode (positive electrode composite material layer), the battery temperature increased to 113° C.

Therefore, it can be seen that even if the temperature rise (thermal runaway) of the battery can be suppressed when a short circuit due to a nail penetration or the like occurs at the center portion of the positive electrode, the temperature rise of the battery may not be suppressed sufficiently when a short circuit due to a nail penetration or the like occurs at the end portion of the positive electrode. The reasons may be explained in the following. Specifically, when a short circuit due to a nail penetration or the like occurs at the center portion of the positive electrode composite material layer, the protection layer prevents the positive electrode current collector from being exposed in a nail penetration, preventing a low-resistance short circuit from occurring between the positive electrode current collector and the negative electrode (negative electrode composite material layer), and the generated heat may be diffused in every direction through the positive electrode current collector, the positive electrode composite material layer and the like, which makes it possible to suppress the temperature rise sufficiently. On the other hand, when a short circuit due to a nail penetration or the like occurs at the end portion of the positive electrode, the direction in which the heat can be diffused through the positive electrode current collector, the positive electrode composite material layer and the like is limited, which makes it impossible to suppress the temperature rise sufficiently.

On the contrary, it can be seen that in Examples 1 to 7 in which the end portion of the protective layer has a smaller ratio of the conductive material, even if a short circuit due to a nail penetration or the like occurs at the end portion of the positive electrode, the temperature rise of the battery can be suppressed.

However, in Comparative example 2 where the end portion of the protective layer containing a smaller ratio of the conductive material has a width A (A=1 mm, A/B=0.015, Sc/S=0.06) smaller than that in the example, the temperature rise was not sufficiently suppressed, and the battery temperature increased to 105° C. Thus, it is found that when the ratio Sc/S of the area Sc of the end portion of the protective layer to the total area S of the protective layer (the positive electrode composite material layer) is 0.12 or more, the effect of suppressing the temperature rise of the present disclosure can be obtained. In addition, it is found that when the ratio A/B of the width A of one end portion of the protective layer to the width B of the entire protective layer (the positive electrode composite material layer) is 0.03 (Example 2) or more, the effect of suppressing the temperature rise can be obtained more reliably.

According to Example 8, as long as the protective layer provided on the positive electrode current collector has an end portion having a smaller ratio of the conductive material than the central portion, even if the end portion is firstly formed for the purpose of improving the alignment efficiency or the like during manufacturing, and then the central portion is formed by coating the same material on the end portion, and thereby the thickness of the end portion is thicker than that of the central portion, the effect of the present disclosure can be obtained.

Furthermore, from the results of Examples 1 to 5, it was found that the increase in battery resistance (IV resistance) in Examples 1 to 4 (Sc/S≤0.45, AiB≤0.13) was reduced to about 10% with respect to Comparative example 1, and in Example 5 (Sc/S=0.51, A/B=0.15), the increase in battery resistance was reduced significantly to 20% or more. Therefore, from the viewpoint of suppressing an increase in battery resistance, the ratio Sc/S is preferably 0.45 or less, and the ratio A/B is preferably 0.13 or less.

Although the present disclosure has been described and illustrated in detail, it is clearly understood that the same is by way of illustration and example only and is not to be taken by way of limitation, the scope of the present subject matter is interpreted by the terms of the appended claims.

What is claimed is:

1. A positive electrode for a non-aqueous electrolyte secondary battery, comprising:
    a positive electrode current collector;
    a protective layer provided on a surface of the positive electrode current collector; and
    a positive electrode composite material layer containing a positive electrode active material provided on a surface of the protective layer,
    the protective layer including an insulating filler, a binder and a conductive material,
    the protective layer being composed of a central portion and an end portion in a plan view as seen from the stacking direction of the positive electrode current collector, the protective layer and the positive electrode composite material layer,
    a ratio of the conductive material in the end portion of the protective layer being smaller than a ratio of the conductive material in the central portion of the protective layer, and
    a ratio Sc/S of an area Sc of the end portion of the protective layer to a total area S of the protective layer in the plan view being from 0.12 to 0.51.

2. The positive electrode according to claim 1, wherein the ratio Sc/S is from 0.12 to 0.45.

3. A non-aqueous electrolyte secondary battery comprising the positive electrode according to claim 1.

4. The positive electrode according to claim 1, wherein the ratio of the conductive material in the central portion of the protective layer is 8 mass % or less when a total mass of the protective layer is considered to be 100 mass %.

5. The positive electrode according to claim 1, wherein the ratio of the conductive material in the end portion of the protective layer is 3 mass % or less when a total mass of the protective layer is considered to be 100 mass %.

* * * * *